United States Patent [19]

Khan

[11] Patent Number: 5,097,376
[45] Date of Patent: Mar. 17, 1992

[54] CONTAINER WITH RECORDING MEDIUM HAVING FRAGRANCE MATERIAL IN OR ON THE RECORDING MEDIUM

[75] Inventor: Tasneem A. Khan, Mannheim, Fed. Rep. of Germany

[73] Assignee: BASF Aktiengesellschaft, Fed. Rep. of Germany

[21] Appl. No.: 718,310

[22] Filed: Jun. 18, 1991

Related U.S. Application Data

[62] Division of Ser. No. 482,842, Feb. 22, 1990, abandoned.

[30] Foreign Application Priority Data

Mar. 8, 1989 [DE] Fed. Rep. of Germany ... 8902833[U]

[51] Int. Cl.$^5$ ............................................... G11B 23/02
[52] U.S. Cl. ..................................... 360/132; 242/197
[58] Field of Search ................................. 360/132–133, 360/131; 242/197–201

[56] References Cited

U.S. PATENT DOCUMENTS 4,905,112 2/1990 Rhodes ................................. 360/132

Primary Examiner—A. J. Heinz
Attorney, Agent, or Firm—Keil & Weinkauf

[57] ABSTRACT

A container, in particular a tape cassette having a container housing and a recording medium present therein is provided in and/or on the housing and/or on the recording medium itself with a fragrance material which is either introduced into the plastic material or applied to the plastic parts.

This fragrance material can be used for any containers with recording media, in particular for cassettes, of all types for audio information, video information, data or other information.

10 Claims, 1 Drawing Sheet

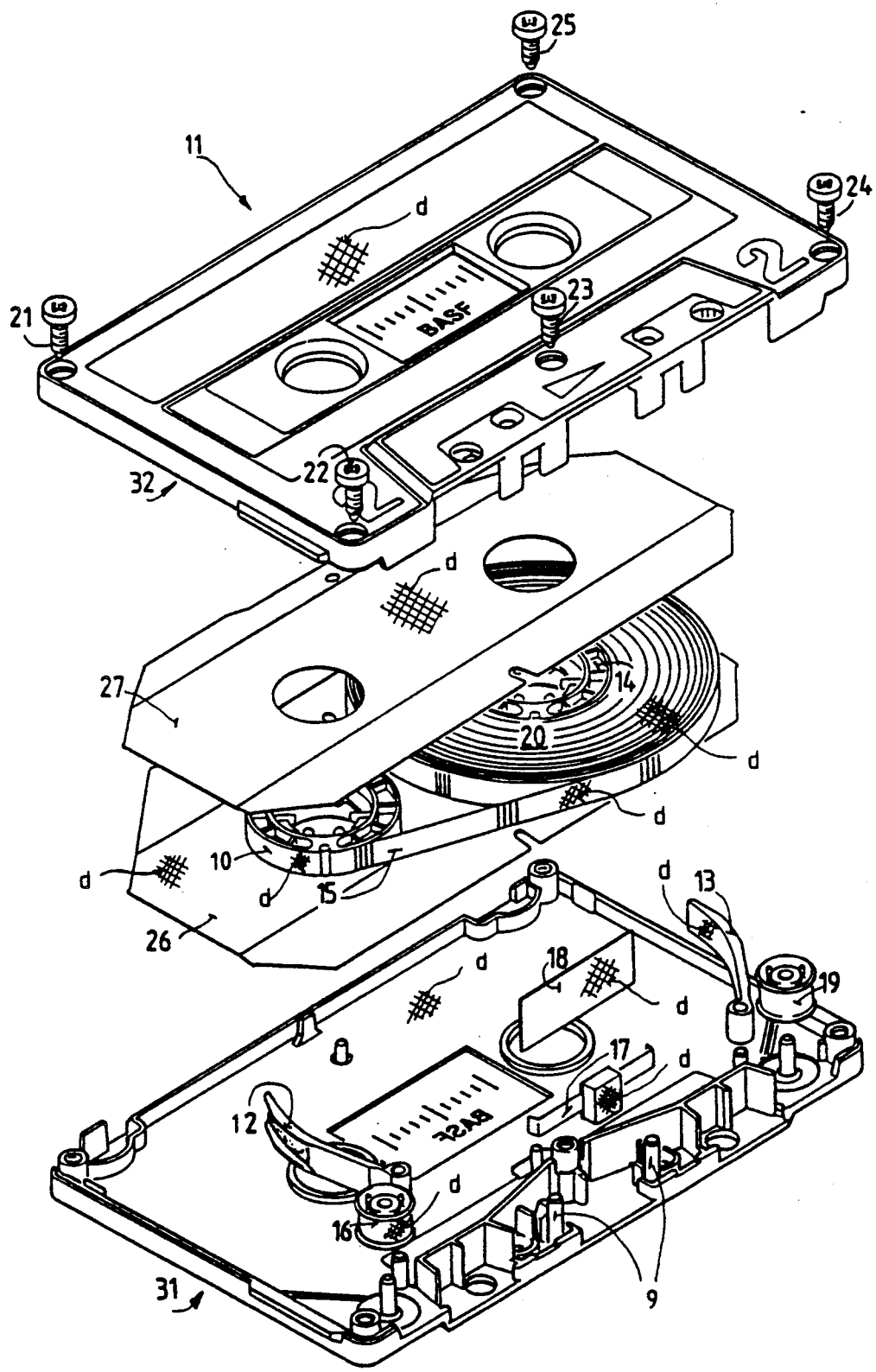

CONTAINER WITH RECORDING MEDIUM HAVING FRAGRANCE MATERIAL IN OR ON THE RECORDING MEDIUM

This is a divisional application of Ser. No. 07.482,842, Filed Feb. 22, 1990 now abandoned.

The present invention relates to a container with a recording medium, in particular a tape cassette, having at least one fragrance material which emits a fragrance at least from time to time, comprising a cassette housing, at least one recording medium and guide, pinch and winding elements for the recording medium and other cassette elements.

Container or cassette with recording medium is, in the widest sense, any recording medium from film through video and audio tape to punched tape and typewriter ribbons and from photographic plates through video disks to computer disks and diskettes, which is either predominantly stored in a cassette or another jacket and can be played back inside or outside the cassette or jacket.

The present invention is illustrated using the audio cassettes as an example.

In the audio cassette sector, various methods have been used for aesthetically distinguishing the cassettes of different types or brands and manufacturers. One method was to use different colors or surface structures of the cassette housing or further design features, such as window size and arrangement, color and design of the hubs, color of the leaders, etc. Other differences were in the color and form of the packaging and/or storage box and in the folded insert sheets contained therein, and the latter could, for example, directly indicate the trade mark of the performing artist or artists, for example a video clip of these artists.

All possible distinguishing features mentioned are relatively expensive and in particular result in the aesthetic differences between the cassettes themselves remaining relatively small.

It is an object of the present invention to improve such containers with recording media, in particular cassettes and to increase the aesthetic appearance and the aesthetic differentiation of individual containers, in particular cassettes, and individual cassette types and brands with respect to one another.

We have found that this object is achieved by a container with a recording medium, in particular a tape cassette, having at least one fragrance material which emits a fragrance continuously or from time to time, comprising as container parts, a container housing, at least one recording medium therein and guide, pinch and winding elements for the recording medium and other container elements, if the fragrance material is present in or on parts of the recording medium and/or of the container housing and/or of guide elements and/or of the pinch or cleaning elements and/or of special fragrance-carrying elements fastened to the recording medium and/or container elements.

This may give the container or cassette an additional, marked fragrance characteristic which is very quickly perceptible, and also has other advantages. For example, this advantageously enables a blind person to distinguish different types or brands of containers or cassettes from one another without it being necessary to provide special visible or palpable markings on the container or cassette housings.

This novel distinguishing feature also permits a car driver to select a cassette more easily and more reliably if, for example, the type of music recorded is denoted by aesthetically easily and quickly distinguishable fragrance materials.

In a practical embodiment of a container or cassette in whose housing a pinch means for the recording medium is present, the fragrance material can be provided on the pinch means, in particular on the felt pad or on a cleaning fleece. In this case, the felt or fleece material can be impregnated with the fragrance material.

In another embodiment of a container or cassette in whose housing at least one support liner is provided, this may be effected by incorporating the fragrance material in the film or foam material or by application to the surface of the film.

In a further embodiment of the container or cassette which contains tape guide elements in the cassette housing, the fragrance material can be provided on the tape guide elements.

In the practical embodiments of containers or cassettes described above, it is merely necessary to treat individual parts with the fragrance material, and the remaining container or cassette parts and the recording medium can remain untreated. However, combinations with an additionally treated recording medium are also possible.

In further embodiments, the fragrance material can be provided on at least one fragrance element, which can be fastened in or on the container or cassette housing, on the recording medium or on parts which are enclosed by the container or cassette housing.

Hence, the fragrance element can be used as an additional, economical part and in practice may be in the form of, for example, a fragrance sticker or fragrance pad, and the latter may advantageously consist of felt, fleece or foam material which is provided with a fragrance material.

Introduction of the fragrance material, which is incompatible with the plastic material, is advantageously effected by mixing during production of the plastic material, so that emergence may take place, in particular at room temperature, by exudation through the surface of the produced plastic part to the outside.

Advantageously, plasticizers or resins are mixed with the fragrance material.

In a further method of application, the fragrance material is applied to surfaces of films or of layers or of the container or of the cassette or of the recording medium by spraying on or knife coating, directly or in the form of microcapsules.

Furthermore, in the case of felt, fleece or foam material capable of absorbing liquid, it is advantageous to impregnate the said material with a liquid fragrance material.

Other known methods of introduction and application which are suitable for the generally oily fragrance materials can also be used.

Further details of the invention are disclosed in the following description of embodiments, and the drawing, the final embodiment illustrating a commercial compact cassette from BASF Aktiengesellschaft in an exploded view.

The containers with recording media or cassettes are advantageously, for example, compact cassettes, video cassettes of the different video systems, film cartridges and diskettes.

Suitable fragrance materials are those which, for example, have been disclosed as perfumes, and their parent substances or food aromas, for example coffee aroma, etc. The fragrance materials used may be natural or synthetic substances.

Examples of fragrance materials which may be used are:

1) Typical vanillin fragrances, for example vanillin, anisaldehyde, isovanillin, 4-nitroguaiacol or heliotropin,
2) Fragrances which are derived from benzylacetone, for example raspberry ketones, zingerone, benzyl acetate, 1-(p-hydroxyphenyl)-3-butenone or 1-(m-hydroxyphenyl)-3-butanone,
3) Fragrances of the valencan series, for example nootkatone (fragrance: grapefruit-like), isonootkatone (fragrance: woody), 1,10-dihydronootkatone (fragrance: fruity) or α-vetivone (fragrance: floral, waxy, woody),
4) Typical fragrances and flavorings having a roast aroma, for example 2,5-dimethyl-4-hydroxy-3(2H)-furanone (fragrance: pineapple and strawberry aroma), 2-hydroxy-3,5-dimethyl-2-cyclopentene-1-one, maltol or 3-hydroxy-3-methyl-2-cyclohexen-1-one,
5) Bread aromas, for example isomaltol or 2,5-dimethyl-3(2H)-furanone,
6) Fragrances having a floral and green character, for example jasmone, methyl (−)-jasmonate, (−)-jasmal-acetone or 3-cis-hexanol, 4-cis-heptenal, 5-cis-octen-2-one or 2-trans-6-cis-monadienal,
7) Fragrances of the α-ionone series, for example trans-α-ionone (fragrance: violets), trans-α-damascone or cis-α-ionone (fragrance: cedarwood) or cis-α-damascone,
8) Fragrances of the undecanone series, for example 6-undecanone (fragrance: fruity), 4-undecanone (fruity, rutaceous) or 2-undecanone (rutaceous), and
9) Fragrances of ambergris (fragrance types: tobacco, sandalwood type).

These examples are synthetic fragrance materials (without any claim of completeness).

In addition, as stated above, there are the natural fragrance materials which are obtained, for example, from lavender, orange, rose, lilac, narcissus, clove, lime or jasmin blossom, or essential oils, for example aniseed, valerian, birch, cedar, lemon, clementine, cypress, eucalyptus, pine, geranium, ginger, camomile, peppermint, rosemary, sandalwood, celery, juniper, orange peel, wormwood or cinnamon oil.

This list should once again be regarded as being by way of example and therefore not in the least as complete.

There are other known strongly smelling or fragrant materials, for example gasoline, diesel oil, ammonium chloride, turpentine, petroleum, etc., which are not among the fragrance materials but may be used for the purposes of the present invention.

The way in which the fragrance material can be introduced or applied is illustrated below with reference to examples of compact cassettes, video cassettes and diskettes (including the 3½'inch disk).

EXAMPLE 1

Individually produced tape guide elements of plastic
The cassette housing
The diskette jacket
The support liners in compact cassettes
The substrate film of the recording medium
The layer (e.g. the binder) of the recording medium.

In one or more of the abovementioned cassette or diskette parts, the fragrance material can be introduced in a suitable amount and by a suitable procedure, in particular by admixing, into the plastic before or during production. However, care must be taken to ensure that the fragrance material or parts thereof cannot form a chemically stable compound with the plastic to be treated, i.e. is incompatible, and that the fragrance material gradually reaches the surface and can emerge, in particular at room temperature, through the surface of the treated plastic and can enter the air as a perceptible fragrance.

Introduction is effected, for example, by mixing the fragrance material with conventional additives, antistatic agents and plasticizers or wax.

EXAMPLE 2

A felt pad
One or more fragrance pads
A fleece sheet
A foam sheet
A pad of another material.

In one or more of the above cassette or diskette parts, the fragrance material can be introduced either during production of the plastic material (foam, fleece), the above compatibility restriction being followed. However, it is also possible for the materials, which are generally absorptive or at least capable of taking up liquid, to be impregnated in a suitable manner with the fragrance material.

EXAMPLE 3

All smooth surfaces of films or layers (substrate film, support liners, diskette jacket film, tape layer) can be provided with fragrance in a suitable quantity by applying liquid fragrance material (generally oily) by spraying or knife coating or by applying the said fragrance material in the form of microcapsules. It is advantageous if polar molecular groups capable of retaining the fragrance material for as long as possible are present on the surface to be treated.

The required amount of fragrance material must be adapted to the individual case, depending on the desired intensity of fragrance and the amount in which and rate at which the fragrance material enters the air and can be detected by the human olfactory organs.

The intensity of fragrance can be varied within a wide range.

In a first extreme case, the fragrance material is only suitable for masking another undesirable fragrance or odor.

In the normal case, the fragrance concentration will be greater than the minimum perceptible fragrance concentration of the chosen fragrance material.

With such just perceptible or readily perceptible fragrance concentrations of pleasant fragrance notes, the subconscious or conscious incentive to purchase the cassettes (i.e. subconsciously or consciously perceived) can be increased. In another extreme case, the fragrance concentration is so high that fragrance trees or fragrance dispensers can be replaced by a cassette according to the invention.

If the carrier of the fragrance material comprises elements additionally to be mounted in or on the cassette or diskette, it must be ensured that functioning of the recording medium cannot be impaired.

It is also perfectly possible to combine one or more cassette parts provided with the same or different fragrance materials with a recording medium without a fragrance material, or vice versa. It is likewise possible to provide only the cassette housing with fragrance materials.

The drawing illustrates a commercial compact cassette 11 for audio recording/playback.

The magnetic tape 20 is wound into a tape roll on a hub 14 and can be unwound onto the second hub 10. The cassette housing consists of lid part 32 and bottom part 31, which can be connected by means of screws 21 to 25. Support liners 26 and 27, tape guide rolls 16 and 19, tape guide levers 12 and 13 and tape guide pins 9 can be recognized as tape guide elements near the front of the cassette 11. The leader 15 is fastened to the hub 10 by means of a clamping means. Pinch elements include the pinch spring 17 with the felt pad. The shield plate 18 is among the other individual parts which are contained in cassettes, which may also include tape cleaning means, tape or reel brake means and locking and unlocking means, etc. as, for example, in video cassettes.

The cassette parts or elements which may be provided with fragrance material are marked by a symbol consisting of crossed lines and the letter d. The number of parts here on the compact cassette described by way of example is to be regarded as limited. Application of the fragrance material by introduction into plastic or application to surfaces or impregnation of suitable absorptive materials or mounting by fastenable fragrance-carrying elements can be effected in each case in a suitable, advantageous and economical manner, as described specifically in the claims.

It is also possible for a plurality of parts or elements to be provided with one fragrance material or different fragrance materials.

We claim:

1. A container with a recording medium, having at least one fragrance material which emits a fragrance continuously or from time-to-time, comprising, as container parts, a container housing, at least one recording medium therein and guide, pinch and winding elements for the recording medium and other elements, wherein the fragrance material is present on or in said recording medium.

2. A container as defined in claim 1, wherein the fragrance material is provided on at least one fragrance-carrying element which is fastened to the recording medium.

3. A container as defined in claim 1, wherein said container is a tape cassette.

4. A container as defined in claim 3, wherein the fragrance material is provided on a fragrance sticker as a fragrance-carrying element.

5. A container as defined in claim 3, wherein a fragrance material which is incompatible with the plastic material forming the tape of said cassette is admixed prior to or during production of the tape.

6. A container as defined in claim 5, wherein a plasticizer is added to the fragrance material and the mixture is mixed with the plastic material.

7. A container as defined in claim 5, wherein a resin is added to the fragrance material and the mixture is mixed with the plastic material.

8. A container as defined in claim 1, wherein the fragrance material is provided on a fragrance pad as a fragrance-carrying element.

9. A container as defined in claim 1, wherein a plasticizer is added to the fragrance material and the mixture is mixed with the plastic material.

10. A container as defined in claim 1, wherein a resin is added to the fragrance material and the mixture is mixed with the plastic material.

* * * * *